Jan. 9, 1940.    C. B. LARSEN    2,186,759
ANTISKID DEVICE
Filed March 6, 1937

INVENTOR.
CARL B. LARSEN
BY James A. Walsh
ATTORNEY

Patented Jan. 9, 1940

2,186,759

UNITED STATES PATENT OFFICE 2,186,759

ANTISKID DEVICE

Carl B. Larsen, Racine, Wis., assignor to J. I. Case Company, Racine, Wis., a corporation Application March 6, 1937, Serial No. 129,299

6 Claims. (Cl. 152—191)

The present invention relates to anti-skid devices for pneumatic tires, and an object of the invention is to generally improve the construction and operation of devices of this nature.

A further object is to provide such a device which will be very strongly attached to the tire when in use; which will not damage the tire to which it is applied; which will have no projecting parts to be injured by contact with hidden obstructions during operation; and which may be easily applied to or removed from a tire.

Further objects and advantages will become apparent from the following specification and accompanying drawing in which.

Similar reference characters have been applied to the same parts throughout the drawing and specification.

Figure 1:
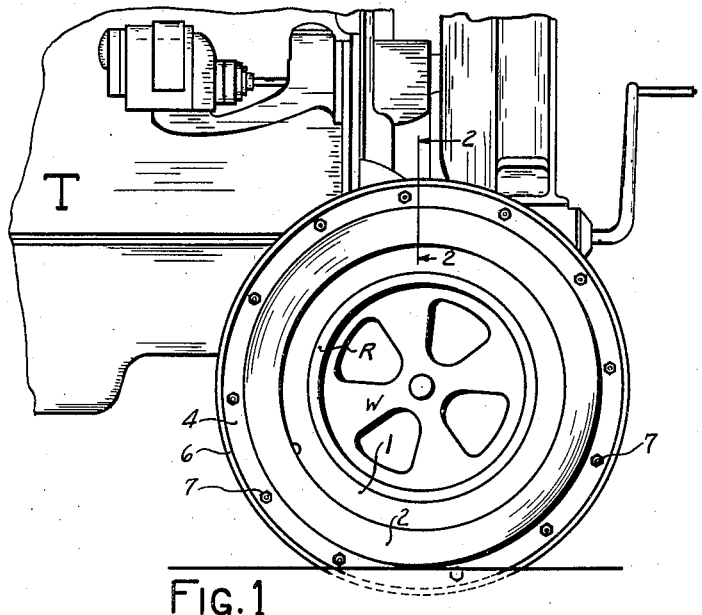
Figure 1 is a front elevation of the device as applied to a tire on the front wheel of a tractor.

Referring to Fig. 1, T represents a portion of a tractor having a wheel W provided with the usual or a suitable rim R carrying a pneumatic tire I to which the device is applied.

Figure 2:
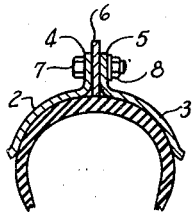
Fig. 2 is a sectional view of the same on the line 2—2 of Fig. 1.

The embodiment of Figs. 1 and 2 comprises shells or annuli 2 and 3, each engaging the periphery and part of one side of the tire, the shells having up-turned flanges 4 and 5 in the neighborhood of the greatest diameter of the tire, presented toward each other.

In this embodiment a ring 6 is interposed between the flanges to form a skid-preventing rim of increased width, as compared to the flanges alone. The two flanges 4 and 5, and the ring 6 are united by suitable readily disengageable means such as bolts 7—7 which may pass entirely through the flanges and ring and engage nuts 8—8. The device may accordingly be readily assembled about a tire, and as readily removed.

When in place it is effective in preventing skidding, but it will be noted that it presents only perfectly smooth surfaces to the tire so that it cannot possibly injure the same, but on the contrary it protects the tire from contact with sharp objects. Furthermore, there are no projections on the outer surfaces of the device to catch on curb stones or other objects when the tractor is used to carry and operate a snow-plow, for example, a service in which chains and the like commonly associated with a tire are continually being torn off.

Figure 3:
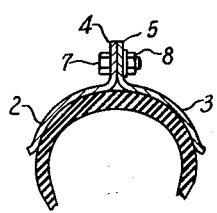
Fig. 3 is a similar view of a modified construction.

A modified form of the invention is shown in Fig. 3, in which the ring 6 is omitted, the skid-preventing rim being formed by the flanges alone. This embodiment may be the same as Figs. 1 and 2 in other respects.

Figure 4:
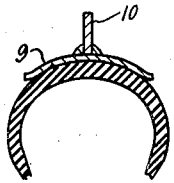
Fig. 4 is a similar view of a further modification.

Fig. 4 shows a modification in which a single shell 9, shallow enough to be forced over the tread of the tire, when the latter is deflated, is provided with an anti-skid ring 10 which may be fixed with the shell in any suitable manner as by welding. The latter embodiments might be adaptable to lighter work than that of Figs. 1 and 2.

Figure 5:
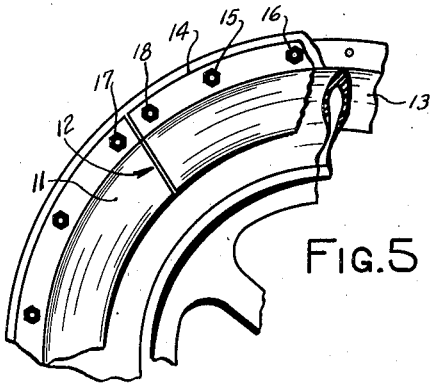
Fig. 5 is a fragmentary elevation of the inner side of a further modified form of the invention.

In the arrangement of Fig. 5, the inner shell 11 is cut as indicated at 12, the outer shell 13 being continuous, as before, and a ring 14 being provided or not as desired. Bolts 15, engaging nuts 16 may be used to fix the parts together.

With this arrangement it is possible to spring the ends of shell 11 apart sufficiently to enable it to pass the axle of the tractor so that it can be put in place between the wheel and tractor and readily assembled with outer shell 13 without disturbing the tire. The ends of this element may be held in alignment when the device is applied to the tire by suitable means, in the present instance by bolts 17 and 18 which may conveniently be similar to above mentioned bolts 15 and 16, but more closely spaced than the latter.

In this embodiment the ring 14 may be omitted if desired in the manner described in connection with Fig. 3.

Figure 6:
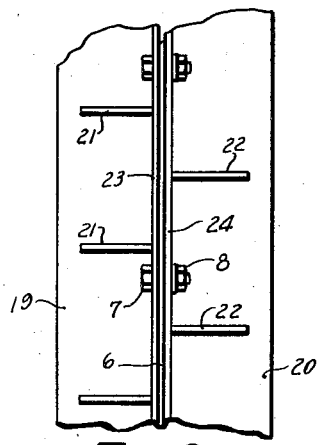
Fig. 6 is a top plan view of an arrangement for increasing traction.

In Fig. 6 is shown a portion of an arrangement in which shells 19 and 20, corresponding respectively to above mentioned shells 2 and 3, Figs. 1 and 2, have suitably fixed therewith, as by welding, a plurality of cross cleats 21—21 and 22—22, suitably spaced about the periphery of the shells to aid in giving the wheel driving or braking traction. The cleats are preferably of the same, or slightly less height than the flanges 23 and 24, so that the device rolls smoothly on the ring 6 or flanges when it is necessary to operate on a pavement.

Although the present invention has been described in connection with a tractor, it is to be understood that it can be used upon any vehicle with which pneumatic tires are used, and that the invention is not limited to use with a tractor, or in fact in any manner except as defined in the subjoined claims.

The above being a complete description of certain illustrative embodiments of the invention, what is claimed as new and desired to be secured by Letters Patent of the United States is:

1. In an anti-skid device for a vehicle a continuous annulus arranged to embrace one side of a tire of the vehicle, and a second annulus arranged to embrace the other side of the tire, said annuli having margin portions presented toward each other about the tread of the tire, a ring interposed between said margins to form an upstanding rim for engaging the ground, and means for separably securing said margin portions to said ring to prevent inadvertent removal of the device from the tire.

2. In an anti-skid device for a pneumatic tire having a tread and side walls, a continuous annulus arranged to embrace a portion of the tread and to extend down one side wall of the tire, and a second annulus arranged to embrace the other portion of the tread and to extend down the other side wall of the tire, said annuli having margin portions presented toward each other about the tread of the tire to form an upstanding rim, portions on one of said annuli arranged for giving said device driving and braking traction, and means for separably connecting said margin portions about the tire to prevent accidental removal of the device from the tire.

3. In an anti-skid device for a pneumatic tire a continuous annulus arranged to embrace one side of a tire, and a second annulus arranged to embrace the other side of the tire, said annuli having margin portions presented toward each other about the tread of the tire, a ring interposed between said margins to form an upstanding rim for engaging the ground, portions on one of said annuli arranged for giving said device driving and braking traction, and means arranged to separably secure said margin portions to said ring to prevent inadvertent removal of the device from the tire.

4. In an anti-skid device for a pneumatic tire having a tread and side walls, a continuous annulus arranged to embrace a portion of said tread and to extend down one side wall of the tire, and a second continuous annulus arranged to embrace another portion of said tread and to extend down the other side wall of the tire, said annuli having margin portions presented toward each other about the tread of the tire to form an upstanding rim, portions on one of said annuli arranged for giving said device driving and braking traction, and means for separably connecting said margin portions about the tire to prevent accidental removal of the device from the tire.

5. In an anti-skid device for a pneumatic tire a continuous annulus arranged to embrace one side of a tire, and a second continuous annulus arranged to embrace the other side of the tire, said annuli having margin portions presented toward each other about the tread of the tire, a ring interposed between said margins to form an upstanding rim for engaging the ground, portions on one of said annuli arranged for giving said device driving and braking traction, and means arranged to separably secure said margin portions to said ring to prevent inadvertent removal of the device from the tire.

6. In an anti-skid device for a pneumatic tire a continuous annulus arranged to embrace one side of a tire, a second continuous annulus arranged to embrace the other side of the tire, said annuli having margin portions presented toward each other about the tread of the tire, a ring interposed between said margins to form an upstanding rim for engaging the ground, and means arranged to separably secure said margins and ring together to prevent inadvertent removal of the device from the tire.

CARL B. LARSEN.